Patented Sept. 30, 1924.

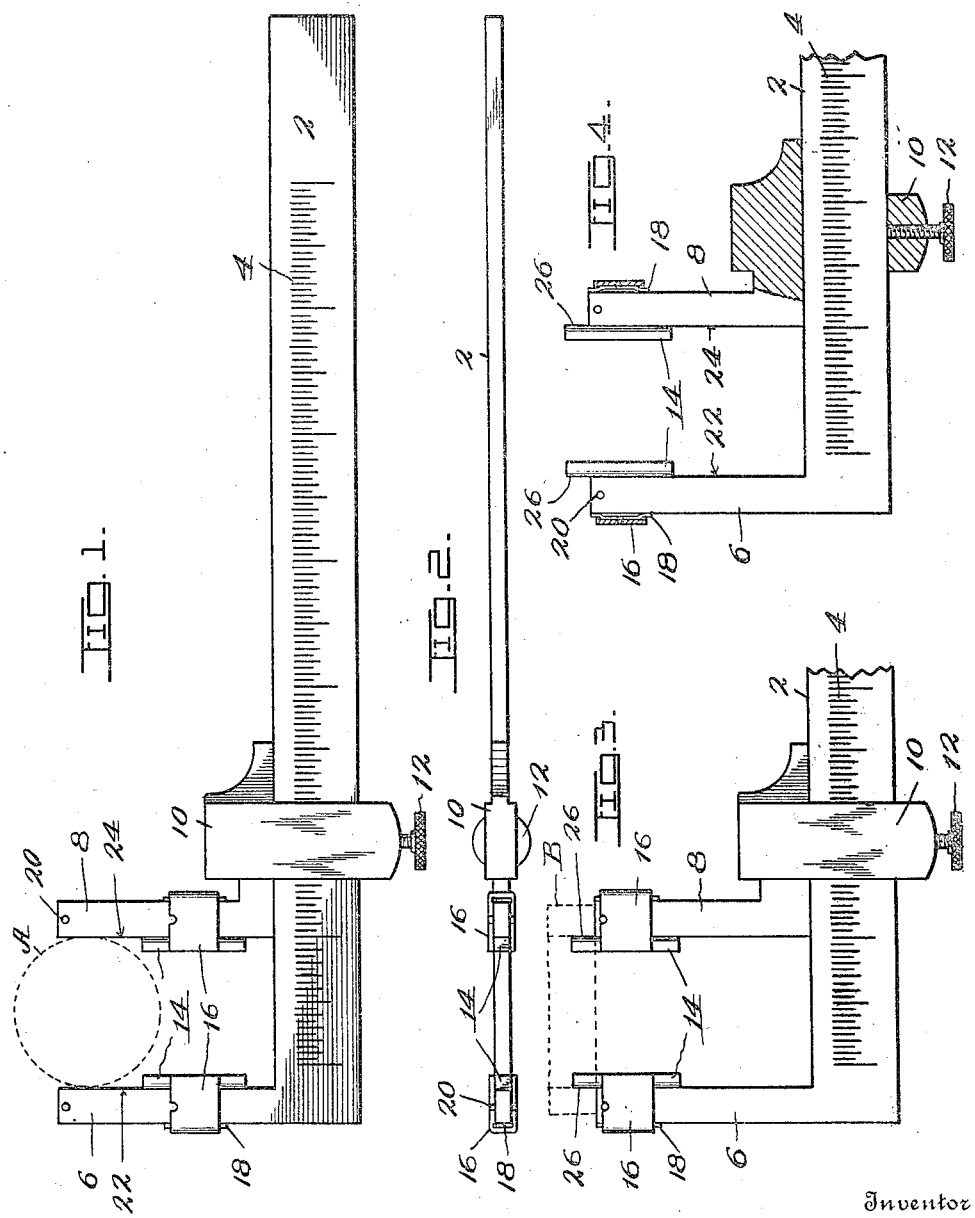

1,510,285

UNITED STATES PATENT OFFICE.

WILLIAM F. LUSTENBERGER, OF ST. JOSEPH, MISSOURI.

CALIPERS.

Application filed March 19, 1923. Serial No. 626,048.

*To all whom it may concern:*

Be it known that I, WILLIAM F. LUSTENBERGER, a citizen of the United States, residing at St. Joseph, in the county of Buchanan and State of Missouri, have invented certain new and useful Improvements in Calipers, of which the following is a specification.

My invention relates to calipers and one object is to provide a new and useful tool of this character which may be employed to advantage in obtaining both inside and outside dimensions.

One important feature of the invention resides in the provision and arrangement of main and supplemental caliper legs whereby a mechanic is enabled to obtain the outside dimension of a body such, for instance, as a shaft by proper adjustment of said main legs and then obtain the inside dimension of a tubular member such, for instance, as a sleeve to snugly fit over said body without changing the position of the main legs, thereby avoiding errors in measurement arising from changing the position of the main legs after an outside dimension has been obtained.

Other features will hereinafter appear, and in order that the invention may be fully understood, reference will now be had to the accompanying drawing, in which:

Fig. 1 is a side elevation of the calipers with the main legs in position for taking the outside dimension of a cylindrical body.

Fig. 2 is a plan view of the calipers.

Fig. 3 is a broken side elevation of the calipers with the supplemental legs in position for taking the inside dimension of a sleeve to fit snugly over the cylindrical body.

Fig. 4 is a broken elevation, partly in section, of the parts in the position disclosed by Fig. 3.

In carrying out the invention, I employ an elongated member 2 provided with a suitable scale 4. The elongated member 2 is provided with a main fixed leg 6 and a main adjustable leg 8, which latter is fixed to a slide 10 embracing the member 2 and adapted to slide longitudinally thereof. The slide 10 is provided with suitable means such, for instance, as a set screw 12 for securing it at any point of its adjustment upon the member 2.

Each of the main legs is provided with a supplemental leg 14 fixed to a slide 16 embracing the respective main leg. Suitable frictional means such as springs 18 are interposed between the slides 16 and the respective main legs to hold said slides 16 at any point of their adjustment. Stops 20 are provided adjacent to the free ends of the main legs 6 and 8 to check the outward movement of the slides 16.

In practice when it is desired to obtain the outside dimension of an object, such for instance as a cylindrical body A, the supplemental legs 14 are slid inwardly to the position disclosed by Fig. 1 and the main leg 8 is adjusted towards the main leg 6 until the inner surfaces 22 and 24, respectively, of said main legs engage diametrically opposed surfaces of the cylindrical body A. Then if it is desired to fit a sleeve or other tubular member such as B snugly over the cylindrical body A, the supplemental legs 14 are slid outwardly, Figs. 3 and 4, until checked by the slides 16 contacting the stops 20. The tubular member B if not already of proper dimension, is machined internally until it fits snugly over the outer surfaces 26 of the supplemental legs 14, such outer surfaces 26 in effect, constituting a continuation of the inner surfaces 22 and 24 of the main legs 6 and 8, respectively.

From the foregoing description it is apparent that a tubular member may be fitted to the external surface of a body without changing the position of the main leg 8, after the same has been adjusted to obtain the external dimension of said body, and hence the liability of making errors such as arise from changing the position of said main legs after obtaining the first measurement, is obviated.

While I have shown and described the preferred construction, combination, and arrangement of parts, I reserve the right to make such changes as properly fall within the spirit and scope of the appended claim.

Having thus described my invention, what I claim and desire to secure by Letters Patent, is:

In a tool of the character described an elongated member, a main leg having a measuring surface and fixed to said member, another main leg slidable on said member, supplemental legs having measuring surfaces and adjustable longitudinally on said main legs and shorter than the same, so that said supplemental legs may be slid inwardly towards the elongated member when outside dimensions are to be taken with the main legs or slid outwardly when inside dimensions are to be taken, slides for holding the supplemental legs in slidable position on the main legs, frictional spring-means coacting with said slides in holding the supplemental legs in any of their adjusted positions, and means at the outer ends of the main legs to coact with the slides in preventing removal of the supplemental legs from the main legs.

In testimony whereof I affix my signature, in the presence of two witnesses.

WILLIAM F. LUSTENBERGER.

Witnesses:
R. B. HAMMOND,
E. J. CAMP.